United States Patent
Hohl et al.

[19]

[11] Patent Number: 6,092,781
[45] Date of Patent: Jul. 25, 2000

[54] ELECTROMAGNETICALLY ACTUATED VALVE FOR HYDRAULIC BRAKE SYSTEMS FOR MOTOR VEHICLES

[75] Inventors: Gunther Hohl, Stuttgart; Norbert Mittwollen, Markgroningen; Dietmar Sommer, Ditzingen, all of Germany

[73] Assignee: Robert Bosch GmbH, Stuttgart, Germany

[21] Appl. No.: 09/117,934

[22] PCT Filed: Nov. 27, 1996

[86] PCT No.: PCT/DE96/02270

§ 371 Date: Aug. 7, 1998

§ 102(e) Date: Aug. 7, 1998

[87] PCT Pub. No.: WO97/28999

PCT Pub. Date: Aug. 14, 1997

[30] Foreign Application Priority Data

Feb. 7, 1996 [DE] Germany ............................ 196 04 317

[51] Int. Cl.⁷ ........................................................ B60T 8/36
[52] U.S. Cl. .................................... 251/129.02; 303/119.2
[58] Field of Search ........................ 251/129.02, 129.15; 303/119.1, 119.2, 119.3

[56] References Cited

U.S. PATENT DOCUMENTS

| | | |
|---|---|---|
| 5,472,266 | 12/1995 | Volz et al. .................... 303/119.1 X |
| 5,603,483 | 2/1997 | Reuter et al. ........................ 251/129.02 |
| 5,605,386 | 2/1997 | Ziegler et al. ........................ 303/119.2 |
| 5,673,980 | 10/1997 | Schwarz et al. ..................... 303/119.2 |
| 5,735,582 | 4/1998 | Eith et al. ............................. 303/119.2 |
| 5,803,556 | 9/1998 | Weis et al. ........................... 303/119.2 |
| 5,879,060 | 3/1999 | Megerle et al. ..................... 303/119.2 |
| 5,934,766 | 8/1999 | Feigel et al. ......................... 303/119.2 |

*Primary Examiner*—John Rivell
*Assistant Examiner*—Meredith H. Schoenfeld
*Attorney, Agent, or Firm*—Ronald E. Greigg; Edwin E. Greigg

[57] ABSTRACT

The valve has a seat valve with a hollow conical valve seat and a closing member in the form of a ball segment. The valve seat is centrally fed by an influx bore that communicates with a pressure fluid inlet. A tappet that has the closing member is engaged by a magnet armature that acts on the seat valve in the closing direction and a restoring spring that acts in the opening direction. The valve, which is embodied as an on-off valve, can be controlled into stable intermediary positions because of the following measures: The diameter of the influx bore virtually corresponds to the seal diameter of the valve seat; the cone angle of the valve seat is at most 90°; the magnetic force can be changed smoothly, wherein its course monotonously decreases as the valve opening stroke increases; the force on the closing member due to the pressure fluid and the restoring spring has a monotonously decreasing course as the valve opening stroke increases and the negative slope of this course is comparatively steeper than that of the magnetic force progression.

5 Claims, 2 Drawing Sheets

ELECTROMAGNETICALLY ACTUATED VALVE FOR HYDRAULIC BRAKE SYSTEMS FOR MOTOR VEHICLES

PRIOR ART

The invention is based on an electromagnetically actuated valve for hydraulic brake systems of motor vehicles.

A valve of this kind has already been disclosed. (DE 44 12 648 A1), whose seat valve assumes its open position through the action of a restoring spring and can be switched in a magnet-actuated manner into its position that stops the through flow of pressure fluid. In terms of its design, the known valve is thus an on-off valve in the form of a reasonably priced 2/2-way valve. Furthermore, structural measures on the closing member and tappet achieve the fact that starting from the closed position of the seat valve, when there is a sufficiently great pressure difference, hydraulic forces cause a partially closed position to be automatically set, in which the volume flow is reduced. The known valve can therefore be advantageously used, for example, in slip-controlled hydraulic brake systems in order, when there is a pressure increase, e.g. of a brake slip regulation, to produce a favorable behavior with regard to the performance quality and the noise emission.

ADVANTAGES OF THE INVENTION

The valve according to the invention, has the advantage over the prior art that it can, in a manner similar to a proportional valve, be transferred into an arbitrarily large number of intermediary positions by means of controlling the magnetic force with small strokes, but without having the costly design of a proportional valve. This action can be attributed to the fact that by way of the valve stroke, the restoring spring essentially determines the progression of the force engaging the tappet, while the hydraulic force acting on the closing member only has a subordinate influence due to the geometric proportions of the influx bore and the valve seat. A largely continuous through flow control can therefore be produced with the valve according to the invention. In many industrial applications, it can be used in place of proportional valves. In slip-controlled brake systems, the use of the valve according to the invention results in a higher performance quality and a lower noise emission than with the known valve.

With the embodiments indicated herein, a definite relief of the pressure fluid stream from the closing member and from the valve seat, respectively, is achieved after the opening of the valve. Unstable flow forces are consequently prevented to a large extent.

The improvement of the invention disclosed has the advantage that a pressure fluid stream relieved from the closing member and the valve seat no longer strikes the tappet as its course continues. This prevents interfering influences due to flow forces.

With the embodiment of the invention indicated, it is easily possible to adjust the spring force of the restoring spring, for example in the closed position of the seat valve, by means of adjusting the position of the sleeve relative to the tappet.

BRIEF DESCRIPTION OF THE DRAWINGS

An exemplary embodiment of the invention is shown in simplified form in the drawings and will be explained in detail in the description below.

DESCRIPTION OF THE EXEMPLARY EMBODIMENT

Figure 1:
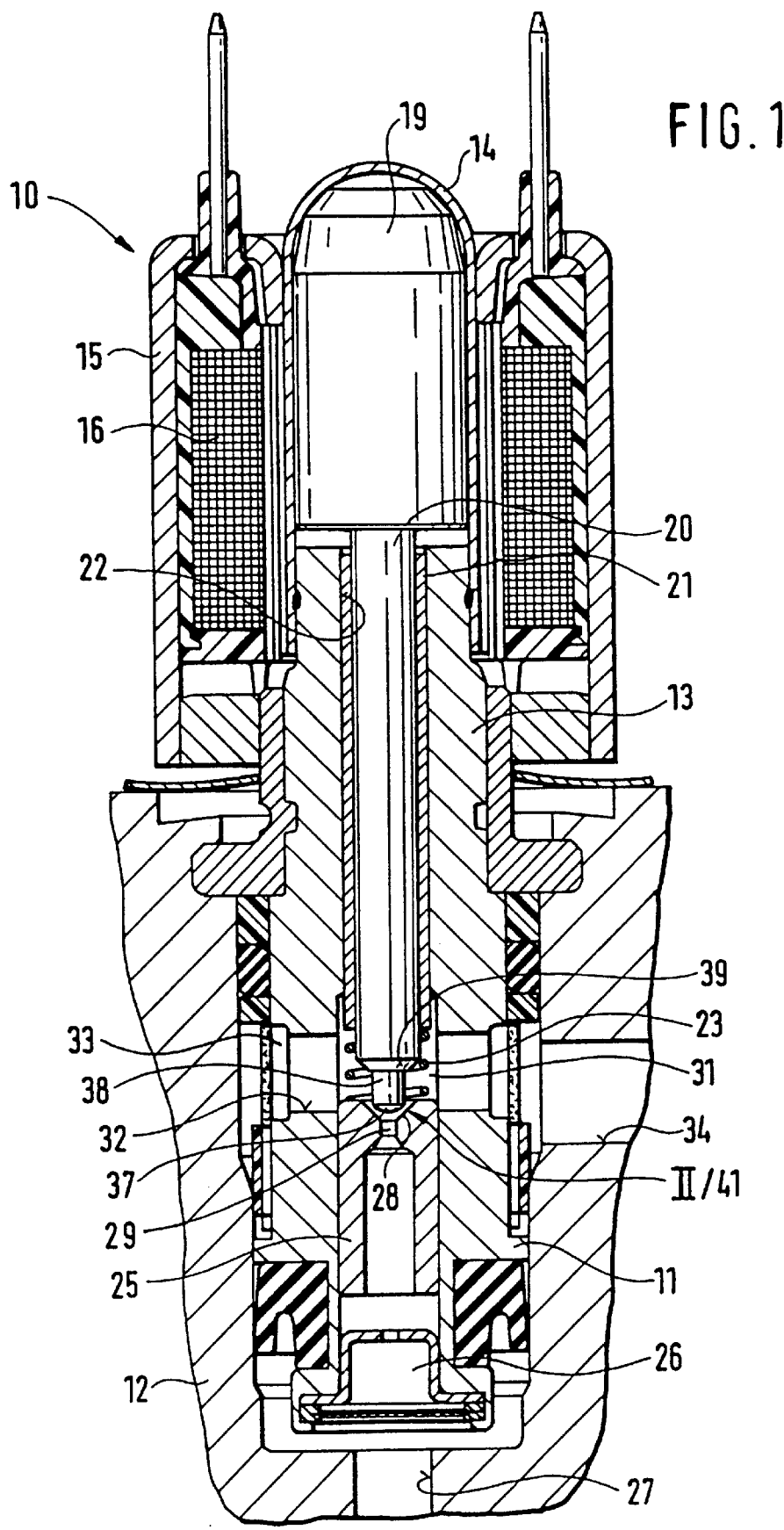
FIG. 1 shows a longitudinal section through an electromagnetically actuated valve with a seat valve, FIG. 2, as detail II from FIG. 1, shows the seat valve disposed in the closed position, in a scale that is enlarged in relation to FIG. 1.

An electromagnetically actuated valve 10 depicted in FIG. 1 of the drawings has a valve housing 11 with which it is received in a valve block 12. Outside the valve block 12, the valve housing 11 is continued in a pole core 13. A sleeve-shaped valve dome 14 is fastened in a pressure tight fashion on the pole core 13. An annular magnet coil 16, which is enclosed by a magnetic flux-conducting housing 15, is slid onto this valve dome and onto the pole core 13.

A longitudinally movable magnet armature 19 is disposed in the valve dome 14. This armature engages a tappet 20 onto which a sleeve 21 is pressed. The tappet 20 and the sleeve 21 are received by the pole core 13 and the valve housing 11 in a longitudinally movable manner in a longitudinal bore 22. Remote from the armature, a restoring spring 23 engages a support face 24 of the sleeve 21 (FIG. 2) on the end face.

The restoring spring 23 is supported against a longitudinally through-bored valve body 25 that is press-fitted into the valve housing 11. This valve body is connected to a pressure fluid inlet 26 of the valve 10, which communicates with a line bore 27 of the valve block 12.

Figure 2:
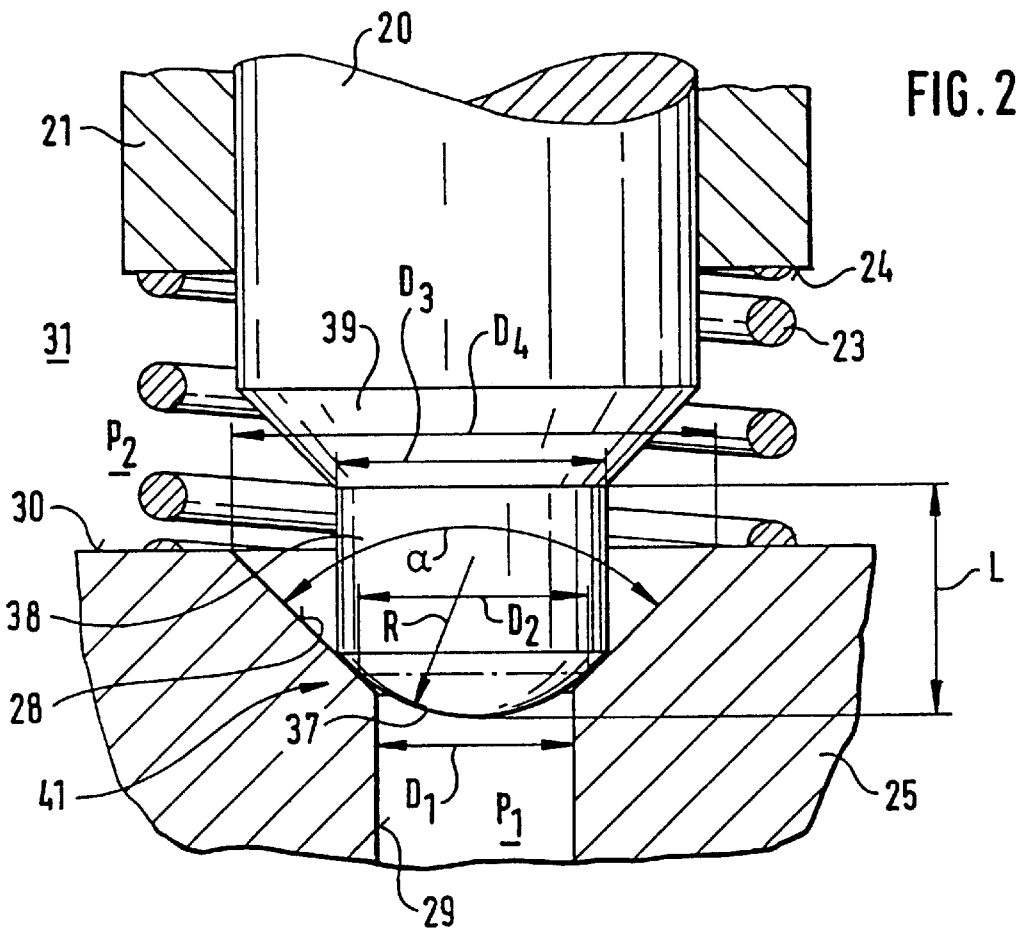

On the tappet end, the valve body 25 has a hollow cone-shaped valve seat 28, with a cone angle α of at most 90° (FIG. 2). An influx bore 29 with the diameter $D_1$, which communicates with the pressure fluid inlet 26, feeds centrally into the valve seat 28. On the radial outside, the valve seat 28 ends in a sharp edge at an end face 30, which defines the valve body 25 in relation to a valve chamber 31 and runs at right angles to an axis in which the valve body 25, the valve seat 28, the tappet 20 with the sleeve 21, and the magnet armature 19 are disposed. The valve chamber 31 is connected to a lateral bore 32, which constitutes the pressure fluid outlet 33 of the valve 10 and communicates with a line bore 34 of the valve block 12. The longitudinal bore 22 and the valve dome 14 communicate in a pressure fluid-carrying manner with the valve chamber 31. The magnet armature 19 and the tappet 20 with the sleeve 21 are therefore bathed in pressure fluid.

A valve closing member 37 in the form of a ball segment cooperates with the valve seat 28. The closing member 37 is embodied on the end face on a diametrically reduced cylindrical section 38 of the tappet 20 in the valve chamber 31. The cone angle α of the valve seat 28 and the radius R of the closing member 37 are matched to each other in such a way that the seal diameter $D_2$ of the valve seat corresponds to or is slightly greater than the diameter $D_1$ of the influx bore 29. On the other hand, the diameter $D_3$ of the tappet section 38 corresponds, at least virtually, to the diameter $D_2$ of the valve seat 28, i.e. the tappet section 38 is slightly greater than the seal diameter. The transition of the closing member 37 to the tappet section 38 is embodied as sharp-edged. Including the closing member 37, the tappet section 38 has an axial length L which at least corresponds to the seal diameter $D_2$ of the valve seat 28. After a transition section 39, the tappet section 38 transitions into the tappet 20 with an amount of taper that corresponds to the valve seat 28. In addition, it can be seen in FIG. 2 that the ending of the valve seat 28 in the end face 30 has a diameter $D_4$, which corresponds to at least twice the seal diameter $D_2$ of the valve seat.

The valve seat 28 of the valve body 25 and the closing member 37 of the tappet 20 constitute a seat valve 41, which assumes its open position when the magnet coil 16 is without current, due to the action of the restoring spring 23. When supplied with current, the valve 10 can be switched over into the closed position of the seat valve 41. The electromagnetically actuated valve 10 is consequently an on-off valve in the form of a 2/2-way valve. It can be used in hydraulic brake systems of motor vehicles, as disclosed in the reference DE 44 12 648 A1 mentioned at the beginning and as extensively described with regard to the wiring diagram and function in the reference DE 41 19 662 A1. In a use of this kind, the pressure fluid inlet 26 of the valve 10 is connected to a master cylinder as a pressure generator of the brake system and the pressure fluid outlet 33 is connected to a wheel brake as a pressure consumer.

Conventional on-off valves differ from the valve according to the invention, for example, by virtue of the fact that in the seat valve, cone angles α of greater than 90° are chosen in order to be able to use larger diameter balls as the closing member 37 because these are easier to handle when mounting on the tappet 20. Furthermore, in the conventional seat valve, the endeavor is to embody the transition between the ball surface of the closing member 37 and the tappet 20 as edge-free. Finally, the magnet armature in the conventional valve is laid out in such a way that the magnetic force rises in an increasingly steep fashion in the transition into the closed position.

The valve 10 according to the invention distinguishes itself from the prior art in the following manner:

In the closed position (FIG. 2) of the seat valve 41, the influx side pressure $p_1$ acts on an effective area of the tappet section 38, which is circumscribed by the seal diameter $D_2$ and exerts an opening force on the tappet 20. The downstream pressure $p_2$ prevailing in the valve chamber 31 and in the valve dome 14 is lower than the pressure $p_1$ and acts on the tappet 20 with a force in the closing direction. The hydraulic force $F_p$ resulting from these two forces consequently acts on the tappet 20 in an opening direction. The restoring spring 23, which is embodied as a screw compression spring, also acts on the tappet 20 with a force $F_F$ in the opening direction.

When the valve 41 opens starting from its closed position, the lower pressure level $p_2$ advances to a slight degree in the direction of the influx bore 29. However, since this virtually corresponds to the seal diameter $D_2$ of the valve seat 28, it does not result in a significant reduction of the opening force exerted by the pressure $p_1$ on the effective area of the tappet section 38. With the assumption of a constant pressure difference between $p_1$ and $p_2$, therefore, the resulting hydraulic force $F_p$ falls in a monotonously decreasing manner over the increasing valve opening stroke H, with only a comparatively shallow negative slope. For the balance of forces on the tappet 20, though, the restoring spring 23 has a considerable significance by virtue of the fact that it has a relatively high spring rigidity and as a result, with an increasing valve opening stroke H, the spring force $F_F$ monotonously decreases with a comparatively steep negative slope. When the seat valve 41 closes, the conditions are correspondingly reversed.

Figure 3:
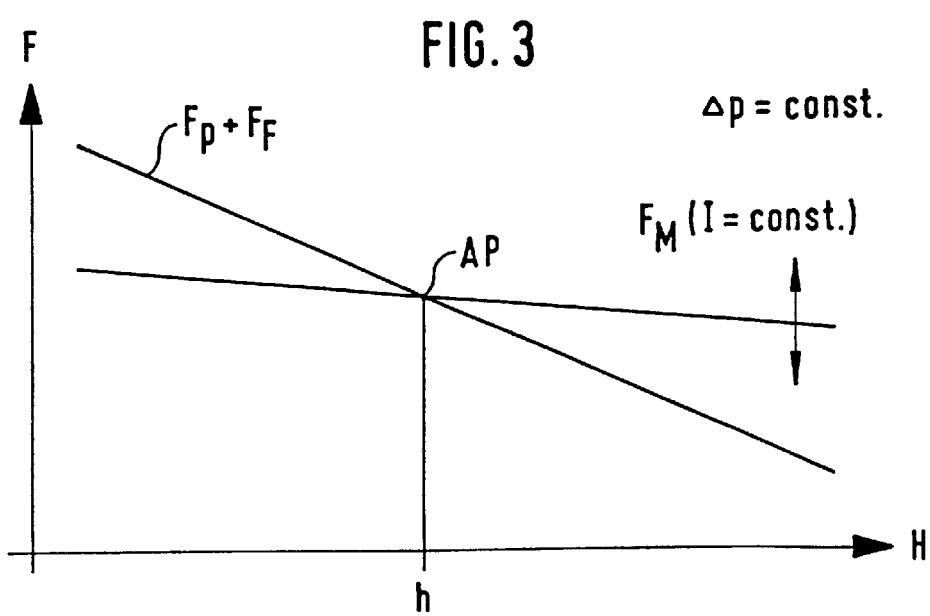
FIG. 3 shows a diagram of the forces acting in the seat valve over the valve opening stroke.

The progression of the forces $F_p+F_F$, which are additively concatenated with each other, over the valve opening stroke H is indicated in a diagram in FIG. 3, in which the abscissa is associated with the stroke H and the ordinate is associated with the force F. Comparatively speaking, the characteristic curve of this cumulative force has a relatively steep negative slope. Since this depends substantially on the characteristic curve of the restoring spring 23 and less on the change of the hydraulic force $F_p$ over the valve opening stroke H, it is necessary to adjust the spring force very precisely for the function of the valve 10 according to the invention. This can occur by virtue of the fact that when the tappet section 38 engages the valve seat 28, the sleeve 21 is slid relative to the tappet 20 until the magnitude of the spring force is achieved that is required at stroke 0 of the seat valve 41. Due to the press connection between the tappet 20 and the sleeve 21, this adjustment is executed in a long-lasting fashion.

The shaping of the seat valve 41 assures that the characteristic curve progression $F_p+F_F$ reproduced in the diagram is to a large extent free of interrupting influences. In this manner, a slight deflection of the pressure fluid streams in the seat valve 41 is achieved by means of the relatively small cone angle α of the valve seat 28. As a result, few impulse forces are produced, which particularly occur when there are large through flows. The dependence of the valve properties on the pressure differential and temperature of the pressure fluid is therefore low. Furthermore, the sharp-edged transition between the closing member 37 and the tappet section 38 assures that the pressure fluid flow continuously separates there and consequently leads to uniform flow forces on the closing member 37. The sharp-edged ending of the valve seat 28 at the end face 30 of the valve body 25 also contributes to a stable pressure fluid flow. The effect of the pressure fluid flow on the coils of the restoring spring 23 is therefore largely free of interfering influences. Furthermore, the axially recessed transition section 39 largely prevents pressure fluid streams from striking the tappet 20.

The above-mentioned hydraulic force $F_p$ and the spring force $F_F$ are counteracted by the magnetic force $F_M$, which acts in the closing direction of the seat valve 41 and is generated through the excitation of the magnet coil 16. The magnetic force $F_M$ must reach at least a magnitude sufficient to transfer the seat valve 41 into the closed position counter to the hydraulic force $F_p$ and the spring force $F_F$ and to hold it in this position. As the characteristic curve of the magnetic force $F_M$ shows in the diagram according to FIG. 3, measures in the embodiment of the magnetic circuit that are familiar to one skilled in the art achieve the fact that with a particular excitation current I=constant, the magnetic force $F_M$ likewise takes a monotonously decreasing course over the valve opening stroke H, but with a comparatively shallower negative slope than that which the force progression $F_p+F_F$ has. The shallow inclination of the characteristic curve $F_M$ can be produced, for example, by means of a corresponding embodiment of the magnetic circuit, in particular when a relatively large residual air gap remains between the magnet armature 19 and the pole core 13 in the closed position of the valve 10 or the magnet armature and the pole core are embodied as a stepped plunger. The magnetic force characteristic curve depicted is representative of a particular excitation current I=constant. Characteristic curves that are shifted in the direction of the ordinate can be produced by means of diverging excitation currents. Altered excitation currents can be adjusted by means of current control, pulse width modulation, and other known processes.

The two characteristic curves $F_p+F_F$ as well as $F_M$ intersect in the diagram at a point in which an equilibrium prevails between the opening hydraulic force $F_p$ as well as the spring force $F_F$ on the one hand and the closing magnetic force $F_M$ on the other hand. This point is referred to as the working point AP, in which the seat valve 41 assumes a stable position at stroke h. A magnetic force characteristic curve that is shifted in the direction of the double arrow in the diagram by means of current control places the working point at a different valve opening stroke. Therefore despite its structural form as an on-off valve, the valve 10 according to the invention can be smoothly controlled with a variable opening stroke in a current-dependent manner, similarly to a proportional valve. This controllability exists at least with small valve opening strokes.

The valve 10 according to the invention can be used in hydraulic brake systems of motor vehicles, for example for brake slip or drive slip control or in brake systems with a hydraulic booster pressure source for the direct control of brake pressure in wheel brake cylinders. A smooth control of pressure and volume flow is advantageously possible with the valve 10 if the brake system is equipped with appropriate sensors and regulation electronics. Also, the valve 10 can be used as a pressure control valve by virtue of the fact that by means of current control, the reaction pressure is set either to constant values or to values that can be changed as a function of use.

The foregoing relates to preferred exemplary embodiments of the invention, it being understood that other variants and embodiments thereof are possible within the spirit and scope of the invention, the latter being defined by the appended claims.

What is claimed is:

1. An electromagnetically actuated valve (10) for hydraulic brake systems in motor vehicles, comprising:

a seat valve (41) provided between a pressure fluid inlet (26) and a pressure fluid outlet (33), the seat valve (41) has a hollow conical valve seat (28) and a closing member (37) in the form of a ball segment, the valve seat (28) is centrally fed by an influx bore (29) that communicates with the pressure fluid inlet (26), the closing member (37) is embodied with a sharp-edged transition at the end face of a cylindrical section (38) of a tappet (20), the tappet (20) is engaged by a magnet armature (19) that acts on the seat valve (41) in the closing direction and a restoring spring (23) that acts in the opening direction, a diameter ($D_2$) of the valve seat (28) is the same as or slightly greater than the diameter ($D_1$) of the influx bore (29), a cone angle ($\alpha$) of the valve seat (28) is at most 90°, a magnetic circuit of the valve (10) is embodied in such a way that a magnetic force exerted on the magnet armature (19) and transmitted to the closing member (37) can be smoothly changed, wherein the magnetic force course monotonously decreases as the valve opening stroke increases, a force ($F_P+F_F$) on the closing member (37) due to the pressure fluid and the restoring spring (23) is modulated in such a way that the force ($F_P+F_F$) has a monotonously decreasing course as the valve opening stroke (H) increases and the negative slope of this course is comparatively steeper than that of the magnetic force progression.

2. The valve according to claim 1, in which the diameter ($D_3$) of the tappet section (38) corresponds, at least virtually, to the seal diameter ($D_2$) of the valve seat (28).

3. The valve according to claim 2, in which the valve seat (28) freely ends in a sharp-edged manner in a diameter ($D_4$) that corresponds to at least twice the seal diameter ($D_2$) of the valve seat.

4. The valve according to claim 2, in which after a length (L) that corresponds to at least the seal diameter ($D_2$) of the valve seat (28), the tappet section (38) ends at a transition section (39) with an amount of taper that corresponds to the valve seat.

5. The valve according to claim 2, in which the tappet (20) carries a pressed-on sleeve (21) which has a support face (24) for the restoring spring (23).

* * * * *